US008423217B2

(12) United States Patent
Kojima et al.

(10) Patent No.: US 8,423,217 B2
(45) Date of Patent: Apr. 16, 2013

(54) HYBRID VEHICLE

(75) Inventors: Yasushi Kojima, Miyoshi (JP); Kensuke Takagi, Seto (JP); Masatoshi Kimata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 191 days.

(21) Appl. No.: 12/937,151

(22) PCT Filed: Jun. 8, 2009

(86) PCT No.: PCT/JP2009/060464
§ 371 (c)(1),
(2), (4) Date: Oct. 8, 2010

(87) PCT Pub. No.: WO2010/001692
PCT Pub. Date: Jan. 7, 2010

(65) Prior Publication Data
US 2011/0093151 A1   Apr. 21, 2011

(30) Foreign Application Priority Data

Jun. 30, 2008 (JP) .................................. 2008-170038

(51) Int. Cl.
*B60W 10/08* (2006.01)
*B60W 10/26* (2006.01)
*B60W 10/06* (2006.01)
*B60W 20/00* (2006.01)

(52) U.S. Cl.
USPC ....................... 701/22; 180/65.275; 180/65.29

(58) Field of Classification Search ................. 180/65.1, 180/65.21, 65.273, 65.29; 320/124; 701/22
See application file for complete search history.

(56) References Cited

U.S. PATENT DOCUMENTS

2005/0061561 A1*  3/2005  Leonardi et al. ............. 180/65.1
2007/0164693 A1*  7/2007  King et al. .................... 318/109
(Continued)

FOREIGN PATENT DOCUMENTS

JP   2003-135345   5/2003
JP   2006-321466   11/2006
(Continued)

OTHER PUBLICATIONS

International Search Report issued in International Application No. PCT/JP2009/060464 dated Sep. 15, 2009 (with translation).

*Primary Examiner* — Khoi Tran
*Assistant Examiner* — Dale Moyer
(74) *Attorney, Agent, or Firm* — Oliff & Berridge, PLC

(57) ABSTRACT

A hybrid vehicle wherein such a situation that the residual capacity of a battery drops significantly below the lower limit of a reasonable range is avoided while fuel efficiency is enhanced. The hybrid vehicle, including an engine, a generator, a battery, and an electric motor for driving, is further provided with a converter for supplying the voltage of the battery that has been boosted to the electric motor, an eco-switch for selecting a first mode or a second mode in association with the boosting operation of the converter, and a hybrid ECU for changing the upper limit of the voltage boosted by the converter from a first upper limit in the first mode to a second upper limit lower than the first upper limit when the second mode is selected by the eco-switch, and changing the upper limit of the voltage boosted by the converter from the second upper limit to the first upper limit when the residual capacity of the battery drops below a threshold.

8 Claims, 7 Drawing Sheets

U.S. PATENT DOCUMENTS

| | | |
|---|---|---|
| 2007/0200521 A1* | 8/2007 | Ochiai et al. .................. 318/376 |
| 2009/0101421 A1* | 4/2009 | Oyobe et al. ................ 180/65.29 |
| 2009/0121669 A1 | 5/2009 | Hanada |
| 2010/0133900 A1* | 6/2010 | King .............................. 307/9.1 |

FOREIGN PATENT DOCUMENTS

| | | |
|---|---|---|
| JP | 2007-055436 | 3/2007 |
| JP | A-2007-089262 | 4/2007 |
| JP | 2007-151247 | 6/2007 |
| JP | 2007-159214 | 6/2007 |
| JP | 2007-306658 | 11/2007 |
| JP | A-2008-136308 | 6/2008 |
| JP | 2009-131079 | 6/2009 |
| WO | WO 2009/068960 A2 | 6/2009 |

\* cited by examiner

HYBRID VEHICLE

TECHNICAL FIELD

The present invention relates to a hybrid vehicle having an engine and a motor as power sources.

BACKGROUND ART

In recent years, hybrid vehicles have become widespread as environmentally-friendly vehicles. As a power source for driving wheels, hybrid vehicles have a motor which is driven by electric power supplied from a battery or a generator, in addition to an engine fueled by gasoline, diesel fuel, or the like.

In some of these hybrid vehicles, a DC voltage supplied from a battery is boosted by a DC/DC converter (hereinafter referred to as a "converter" where appropriate), which is a voltage converter, and the boosted voltage is supplied to an inverter where the DC voltage is converted to an AC voltage and applied to an AC synchronizing motor.

Further, in order to maintain the state of charge (SOC) of a battery within a predetermined appropriate range, control is performed on the electric power generated by a generator from a power of the engine and braking force of the vehicle and control is performed on the electric power consumed by a traction motor of the vehicle.

By including a traction motor in combination with an engine as a power source, such a hybrid vehicle achieves a more fuel efficient drive than that of a vehicle that includes an engine alone as a power source. However, there is still a need to achieve even higher fuel efficiency and energy saving by, for example, enhancing operational efficiency of the motor and engine. Therefore, it has been proposed to provide a switch or the like for instructing a vehicle controller to perform a fuel efficient drive when a user turns ON the switch to give a priority to fuel efficiency rather than to vehicle driving performance. Such a switch is called an "eco-mode switch" or simply "eco switch."

For example, JP 2007-159214 A describes an electric vehicle equipped with an eco switch. It is described that when the eco switch is turned ON by a user operation, a boosting operation of a converter is stopped to thereby eliminate a switching loss at the converter in order to enhance fuel efficiency.

DISCLOSURE OF THE INVENTION

Objects to be Achieved by the Invention

In hybrid vehicles, in order to optimize fuel and energy efficiency, operations of an engine, a traction motor, and a generator motor are controlled while being balanced such that predetermined conditions are satisfied. Thus, when the boosting operation of a converter is stopped by turning ON the eco switch as in the electric vehicle in the above JP 2007-159214 A, a limitation is imposed on the performance of the traction motor and the generator motor. Especially, such a limitation of workload of the generator motor causes a drop of the amount of generated electric power. In such a case, depending on the state of charge (SOC) of a battery and driving state of the vehicle in accordance with a user's operation, an intermittent operation of the engine may be performed more frequently in order to charge the battery. This may cause an undesired result such as a deterioration of the fuel efficiency or drop of the SOC of the battery significantly below the lower limit of the appropriate range.

An object of the present invention is to provide a hybrid vehicle wherein such a situation that the state of charge (SOC) of a battery drops significantly below the lower limit of an appropriate range is avoided while fuel efficiency is enhanced.

Means for Achieving the Objects

The present invention provides a hybrid vehicle comprising an engine, a generator capable of generating electric power from mechanical power received from the engine, a battery for storing the electric power generated by the generator, and an electric motor capable of outputting mechanical traction power from the electric power supplied from the battery and the generator. The hybrid vehicle further comprises a voltage converter for boosting a voltage of the battery and supplying the boosted voltage to the electric motor; a selector for selecting a first mode or a second mode for the boosting operation of the voltage converter; and a controller for switching an upper limit of voltage boosted by the voltage converter from a first upper limit in the first mode to a second upper limit which is lower than the first upper limit when the second mode is selected by the selector, and switching the upper limit of voltage boosted by the voltage converter from the second upper limit to the first upper limit when a state of charge (SOC) of the battery drops below a threshold.

In the hybrid vehicle according to the present invention, the controller may switch the upper limit of voltage boosted by the voltage converter from the second upper limit to the first upper limit when a state in which power requested to a vehicle by a user exceeds a maximum vehicle output power available in the second mode has continued for a predetermined time period.

In the hybrid vehicle according to the present invention, when the second mode is selected by the selector, the controller may perform, in addition to switching the upper limit of voltage boosted by the voltage converter, at least one of control of changing an engine operating point, control of lowering frequency of a carrier wave which is used to generate an input voltage to the electric motor, and control of operating an accessory including an air conditioner in a save energy mode; and when the state of charge (SOC) drops below a threshold, the controller may perform a control to restore, among controls performed in the second mode, only the upper limit of voltage boosted by the voltage converter from the second upper limit to the first upper limit.

Furthermore, in the hybrid vehicle according to the present invention, the hybrid vehicle may further comprise a generator inverter and an electric motor inverter, both having a DC/AC converting function, and each of the inverters may be connected to a common voltage converter.

Effects of the Invention

In accordance with a hybrid vehicle of the present invention, it is possible to enhance fuel efficiency by reducing an electrical loss at a voltage converter by lowering the upper limit of the voltage boosted by the voltage converter from a first upper limit to a second upper limit when a second mode is selected. Further, it is also possible to avoid a situation that the state of charge (SOC) of a battery drops significantly below the lower limit of an appropriate range, by ensuring that a sufficient amount of electric power is generated by the generator by cancelling a boosting limitation of the voltage converter when the SOC of a battery becomes lower than a threshold.

EMBODIMENTS FOR CARRYING OUT THE INVENTION

Preferred embodiments of the present invention are described in detail below with reference to the accompanying drawings. In the following description, specifics such as shapes, materials, values, and directions are given as examples so as to facilitate understanding of the present invention. These specifics can be appropriately altered in accordance with a use, purpose, and specifications.

Figure 1:
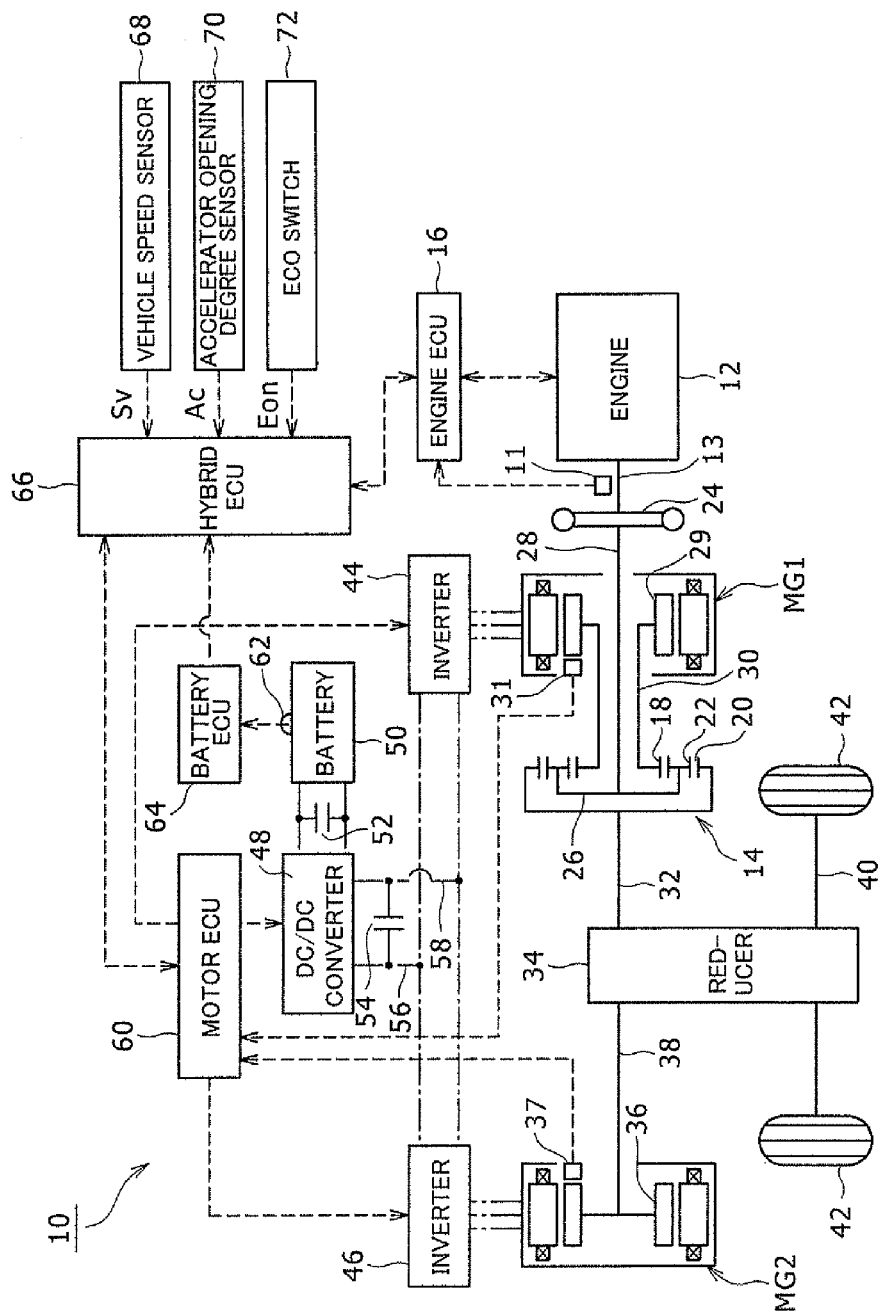
FIG. 1 shows a schematic block diagram of a hybrid vehicle according to an embodiment of the present invention.

FIG. 1 shows a schematic block diagram of a hybrid vehicle 10 according to an embodiment of the present invention. The solid lines, dash-dot lines, and dash lines in FIG. 1 respectively show power transmission lines, electric lines, and signal lines. The hybrid vehicle 10 includes an engine 12 capable of outputting traction power, a pair of three-phase AC synchronous motor generators (hereinafter simply referred to as "motor") MG1 and MG2, and a power distribution/integration mechanism 14.

The engine 12 is an internal combustion engine which generates power by using gasoline, diesel fuel, or the like as fuel. The engine 12 is electrically connected to an engine controlling Electric Control Unit (hereinafter referred to as "engine ECU") 16 such that the operation of the engine 12 is controlled by adjusting fuel injection, ignition, throttling, or the like based on a control signal received from the engine ECU 16. The rotation speed "Ne" of the engine 12 is calculated at the engine ECU 16 by receiving a detected value output from a rotational position sensor 11 which is provided near an output shaft 13 of the engine 12.

The power distribution/integration mechanism 14 comprises a planetary gear train which is structured to include a sun gear 18 arranged in the center portion, an internally toothed ring gear 20 arranged concentrically around the sun gear 18, and two or more carriers 22 engaging with both the sun gear 18 and the ring gear 20.

In the power distribution/integration mechanism 14, a carrier supporting member 26 which rotationally supports the two or more carriers 22 is coupled with a carrier shaft 28 connected to the output shaft 13 of the engine 12 via a damper 24, the sun gear 18 is coupled with a rotation shaft 30 which is connected with a rotor 29 of the motor MG1, and the ring gear 20 is coupled with a reducer 34 via a ring gear shaft 32. In this way, in the power distribution/integration mechanism 14, when the motor MG 1 functions as a generator, the mechanical power of the engine 12 transmitted from the carrier shaft 28 is distributed to the sun gear 18 side and the ring gear 20 side in accordance with a gear ratio. On the other hand, when the motor MG 1 functions as an electric motor, the mechanical power of the engine 12 transmitted from the carrier shaft 28 and the mechanical power of the motor MG1 transmitted from the sun gear 18 are integrated and transmitted from the ring gear 20 via the ring gear shaft 32 to the reducer 34 including a gear train having a predetermined reducing ratio.

A rotation shaft 38 connected to a rotor 36 of the motor MG2 is also connected to the reducer 34 in such a manner that when the motor MG2 functions as an electric motor, the mechanical power from the motor MG2 is transmitted to the reducer 34.

The mechanical power transmitted from at least one of the ring gear shaft 32 and the rotation shaft 38 of the motor MG2 is transmitted to an axle 40 via the reducer 34 so as to rotationally drive wheels 42. On the other hand, when the mechanical power is transmitted to the rotation shaft 38 from the wheels 42 and the axle 40 via the reducer 34 in a regenerative braking operation, the MG2 functions as a generator. Here, the regenerative braking operation includes not only an occasion when a driver slows the vehicle down by performing a braking operation but also an occasion when a driver stops accelerating the vehicle by releasing a gas pedal, or the vehicle travels downhill by using gravity action, and so on.

The motors MG1, MG2 are respectively and electrically connected with corresponding inverters 44, 46. The inverters 44, 46 are electrically connected in parallel to a converter 48 which is a common voltage converter, and further to a battery 50 via the converter 48. For the battery 50, a chargeable/dischargeable secondary battery such as a nickel hydride battery, a lithium ion battery, or the like is preferably used. However, the battery 50 is not limited to such a battery and, for example, a capacitor may be used.

When the motors MG1 and MG2 function as electric motors, a DC voltage Vb supplied from the battery 50 via a smoothing capacitor 52 is boosted to an output voltage Vc by the converter 48, and input to the inverters 44, 46 via a smoothing capacitor 54 (the converter output voltage Vc equals a system voltage VH which is an input voltage of the inverters, and this is also applicable in the following descriptions). Then, the input voltage is converted to AC by the inverters 44, 46 and applied to the motors MG1, MG2.

On the contrary, when the motors MG1, MG2 function as generators, the AC voltage output from the motors MG1, MG2 is converted to DC by the inverters 44, 46, reduced by the converter 48, and then charged to the battery 50. Because the inverters 44, 46 commonly use a power line 56 and a ground line 58 connected to the converter 48, it is also possible to supply the power generated by one of the motors MG1 and MG2 to the other motor without using a converter therebetween.

Each of the inverters 44 and 46 is electrically connected to the motor ECU 60 such that the operation of the inverters 44, 46 is controlled based on a control signal sent from the motor ECU 60. Further, the motors MG1, MG2 are respectively provided with rotation angle sensors 31, 37, which detect respective rotation angles of rotors 29, 36. A value detected by each of the rotation angle sensors 31, 37 is input to the motor ECU 60 where the value is used to calculate rotation speeds Nm1, Nm2 of the respective motors. Further, motor currents detected by current sensors (not shown), which are provided with the respective motors MG1 and MG2, are input to the motor ECU 60.

Battery state detecting sensors 62 such as a current sensor, a voltage sensor, a temperature sensor, or the like are disposed on the battery 50. The values detected by these sensors 62, such as a battery current Ib, a battery voltage Vb, a battery temperature Tb, or the like, are input to the battery ECU 64. The battery ECU 64 estimates the state of charge (SOC) of the battery based on these detected values and monitors so as to maintain the SOC of the battery within an appropriate range such as 40% to 80%, placing the rating SOC of 60% in the middle. The battery ECU 64 outputs, to a hybrid ECU described below, an input limit signal when the detected value is close to the upper limit of the appropriate range of the SOC, or an output limit signal and charging request signal when the detected value is close to the lower limit of the appropriate range of the SOC.

The engine ECU 16, the motor ECU 60, and the battery ECU 64 are electrically connected to a hybrid ECU (controller) 66. The hybrid ECU 66 is configured to include a CPU for executing a control program; a ROM for storing the control program, a control map, or the like; and a RAM or the like for temporarily storing various detected values which are randomly readable. The engine ECU 16 not only integrally controls the operations of the engine 12 and the motors MG1, MG2, but also has a function to manage the battery 50.

When necessary, the hybrid ECU 66 sends an engine control signal to the engine ECU 16 and receives data regarding the operation state of the engine (such as, for example, an engine rotation speed "Ne") from the engine ECU 16. The hybrid ECU 66 also sends a motor control signal to the motor ECU 60 and receives data regarding the operation state of the motor (such as, for example, motor rotation speed "Nm1, Nm2", and a motor current) from the motor ECU 60 when necessary. Furthermore, the hybrid ECU 66 receives from the battery ECU 64 data required to manage the battery 50 such as battery SOC, battery voltage, battery temperature, and an input/output limit signal.

Further, the hybrid ECU 66 is electrically connected with a vehicle speed sensor 68 and an accelerator opening degree sensor 70 from which the hybrid ECU 66 respectively receives a vehicle speed Sv which is a driving speed of the hybrid vehicle 10 and an accelerator opening degree Ac which corresponds to a depressed amount of the accelerator pedal (not shown).

Further, an eco switch (selector) 72 is electrically connected to the hybrid ECU 66. The eco switch 72 is disposed at a position where a driver or user of the eco switch 72 has an easy access. An eco-switch-ON signal "Eon" is input to the hybrid ECU 66 when the user performs a depressing operation, turning operation, or lightly touching operation or the like of the eco switch. When the eco switch 72 is turned ON, a normal mode (first mode) which is used with the eco switch 72 turned OFF is switched to an eco mode (second mode) which enables more fuel efficient drive than in the normal mode.

Figure 2:
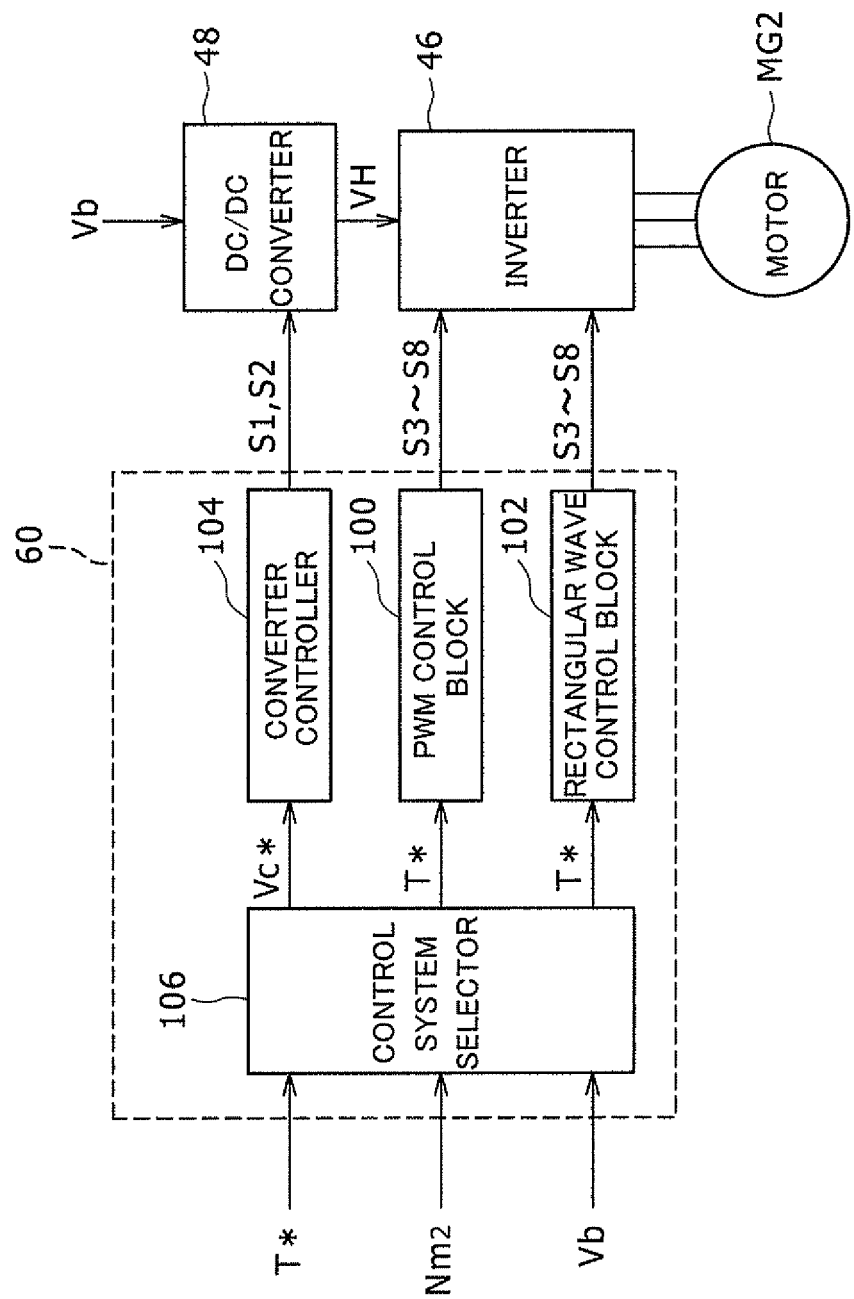
FIG. 2 shows a functional block diagram of a motor ECU.

A voltage control in the motor ECU 60 when the motors MG1 and MG2 function as electric motors is described below with reference to FIG. 2. FIG. 2 shows a functional block diagram of the motor ECU 60. Because a voltage control is performed in a similar manner for the motors MG1 and MG2 when these motors are used as electric motors, the following description mainly explains a control of the motor MG2 which outputs traction power.

The motor ECU 60 includes a control system selector 106 for selecting a control system of the motor MG2; a converter controller 104 for generating and outputting, to the converter 48, switching signals S1, S2 which control ON and OFF of two electric power switching elements (for example, IGBTs) in the converter 48 in response to a converter output voltage command Vc* received from the control system selector 106; and a PWM control block 100 and a rectangular wave control block 102 for generating and outputting, to the inverter 46, switching signals S3 to S8 which control ON and OFF of each pair of power switching elements provided for each phase arm of U-phase, V-phase, and W-phase (six switching elements in total) in the inverter 46 in response to a torque command T* received from the control system selector 106.

Generally, three control systems, a sinusoidal PWM control, over-modulation PWM control, and rectangular wave control, are known as control systems of AC motors.

The sinusoidal PWM control system is a generally-used PWM control. Based on a voltage difference between a sinusoidal voltage command value and a carrier wave (generally, a triangle wave), the sinusoidal PWM control system controls ON and OFF of switching elements provided at each phase arm in the inverter 46 for each phase coil of U-phase, V-phase, and W-phase of the three-phase AC motor MG2. As a result, a duty ratio is controlled such that, in a set of high-level period corresponding to an ON period of the upper arm element and a low-level period corresponding to an ON period of the lower arm element at each phase arm of the inverter 46, a motor input voltage assumes the form of sinusoidal waves in a certain time period. It is well-known that, in the sinusoidal PWM control system, although it is possible to achieve smooth rotation even in a relatively low rotational range, a modulation ratio (or voltage utilization ratio), which is a ratio of a fundamental wave component of motor input voltage to a system voltage VH corresponding to the converter output voltage Vc, can be enhanced only up to 0.61.

On the other hand, in the rectangular wave control, at an each phase arm of the inverter 46, one pulse of a rectangular wave having a one to one ratio between the high level period corresponding to an ON period of the upper arm element and the low level period corresponding to an ON period of the lower arm element is applied to the motor MG2 in a certain time period. In this way, the modulation ratio can be enhanced up to 0.78 such that the output in a relatively high rotational range can be enhanced. Further, as it is also possible to reduce weak field current, an energy efficiency can be enhanced by suppressing occurrence of copper loss at the motor MG2. Further, because the number of switching operations at the inverter 46 can be reduced, there can be achieved another advantage that switching loss can be suppressed. However, it must be noted that the rectangular wave control has characteristics that the rectangular wave control is more easily affected by influence of external disturbance and control responsibility is lower in comparison with the sinusoidal PWM control.

The over-modulation PWM control system is an intermittent PWM control system between the sinusoidal PWM control and the rectangular wave control. In the over-modulation PWM control system, the PWM control similar to the above sinusoidal PWM control is performed after distorting carrier waves so as to reduce amplitude. In this way, a motor input voltage which is shifted in a direction of voltage rise and distorted in a substantially sinusoidal-shape can be generated to improve the modulation ratio within a range from 0.61 to 0.78.

In the motor MG2, because a higher rotation speed or increased output torque increases the induced voltage, required voltage becomes higher accordingly. The boosted voltage Vc by the converter 48; that is, the system voltage VH, must be set higher than this motor requiring voltage. On the other hand, the voltage value which can be boosted by the converter 48 has an upper limit (that is, the maximum system voltage).

Therefore, in a range where the motor requiring voltage is lower than the maximum system voltage VH; for example, 650 V, a maximum torque control by the sinusoidal PWM control system or the over-modulation PWM control system is applied such that the output torque is controlled to match the torque command T* by the motor current control in accordance with a vector control.

On the other hand, when the motor requiring voltage is over the maximum system voltage, while keeping the system voltage VH at the maximum value, the rectangular wave control system is applied in accordance with the field weakening control. In this case, because the amplitude of the motor input voltage is kept constant, a torque control is performed by a voltage phase control of rectangular wave pulse based on a difference between an estimated torque value and a torque command value.

Figure 3:
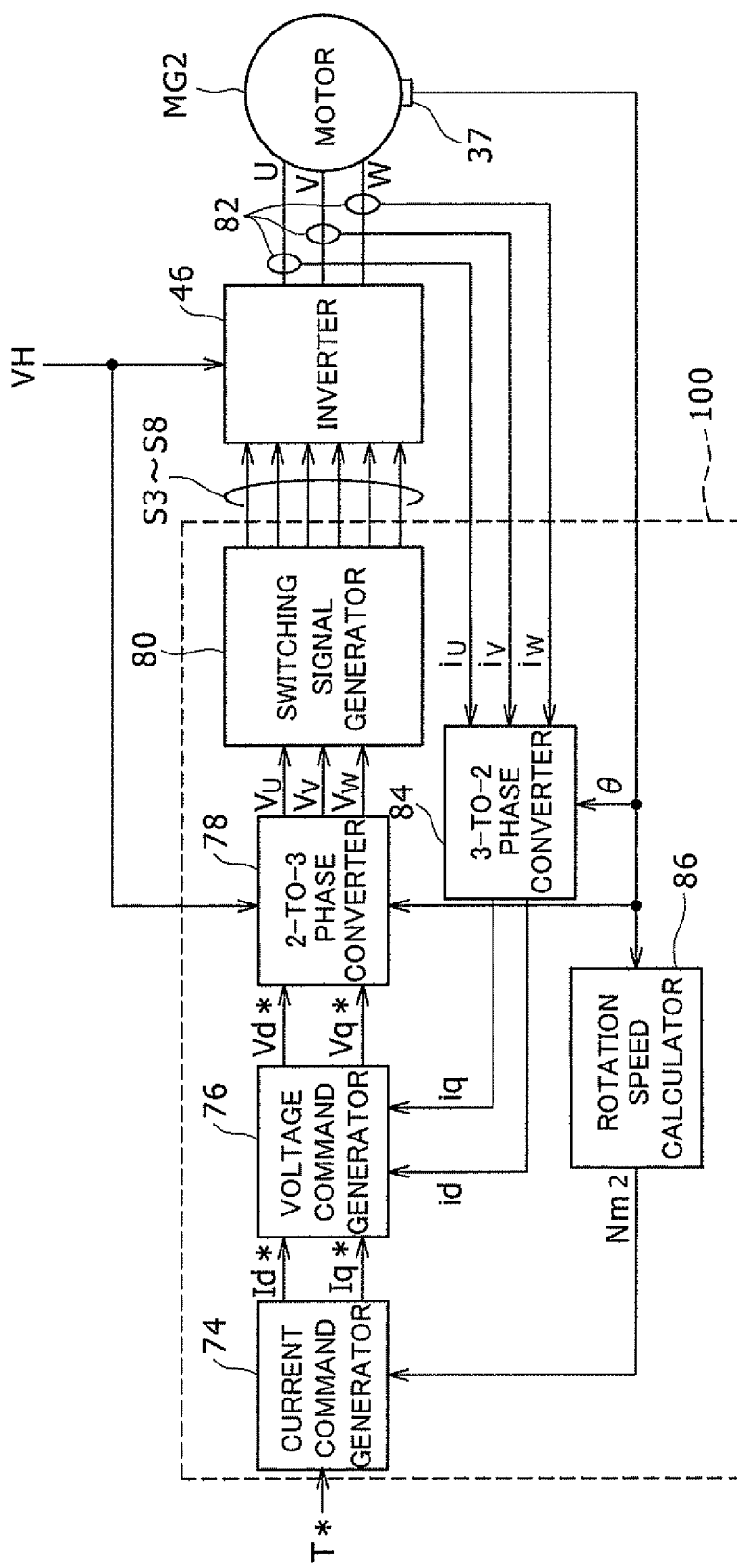
FIG. 3 shows a functional block diagram of a PWM control block included in the motor ECU.

FIG. 3 shows an example functional block diagram of the PWM control block 100 for the motor ECU 60 which performs the maximum torque control in the sinusoidal PWM control and over-modulation PWM control. The PWM control block 100 includes a current command generator 74, a voltage command generator 76, a 2-to-3 phase converter 78, a switching signal generator 80, a 3-to-2 phase converter 84, and a rotation speed calculator 86.

Upon receipt of a torque command T* and motor rotation speed Nm2 input from the hybrid ECU 66 to the motor ECU 60, the current command generator 74 calculates and outputs, to the voltage command generator 76, a d-axis current command Id* and a q-axis current command Iq* corresponding to the torque command T* and motor rotation speed Nm2 based on a predetermined map or table.

The voltage command generator 76 calculates and outputs, to the 2-to-3 phase converter 78, a d-axis voltage command Vd* and a q-axis voltage command Vq* based on the PI calculation shown in Equation 1 below to respectively match the d-axis actual current id and the q-axis actual current iq with the d-axis current command Id* and the q-axis current command Iq*. The d-axis actual current id and the q-axis actual current iq used here are three phase currents, iu, iv, and iw which are detected by the current sensor 82 for detecting each phase current of the motor MG2 and converted based on the motor rotation angle θ by the 3-to-2 phase converter 84. It should be noted that, because the total of the three phase currents iu, iv, and iw is zero, it is possible to detect current of two phases out of three phases, and to obtain the current of the remaining phase by calculation.

$$Vd^* = Gpd(Id^* - id) + Gid(Id^* - id)dt$$

$$Vq^* = Gpq(Iq^* - iq) + Giq(Iq^* - iq)dt \quad \text{(Equation 1)}$$

Where Gpd and Gpq respectively represent proportional gains of d-axis and q-axis current control; and Gid and Giq respectively represent integral gains of d-axis and q-axis current control.

The 2-to-3 phase converter 78 converts the d-axis voltage command Vd* and the q-axis voltage command Vq* to each of three phase voltages, Vu, Vv, and Vw, based on the rotation angle θ of the rotor 36 of the motor MG2 and outputs the converted voltages to the switching signal generator 80. It should be noted that in converting from the d-axis voltage command Vd* and the q-axis voltage command Vq* to each of the three phase voltages, Vu, Vv, and Vw, the system voltage VH is also reflected.

The switching signal generator 80 generates switching signals S3 to S8 based on the comparison between the three phase voltages, Vu, Vv, and Vw, and a predetermined carrier wave and outputs the generated signals to the inverter 46. In this way, each switching element of the inverter 46 is switching-controlled such that an AC voltage required for outputting torque in accordance with the torque command T* is applied to the motor MG 2. As described above, in the over-modulation PWM control, carrier waves used by the switching signal generator 80 are switched from general waves used in the sinusoidal PWM control to the waves which are distorted so as to reduce amplitude.

Figure 4:
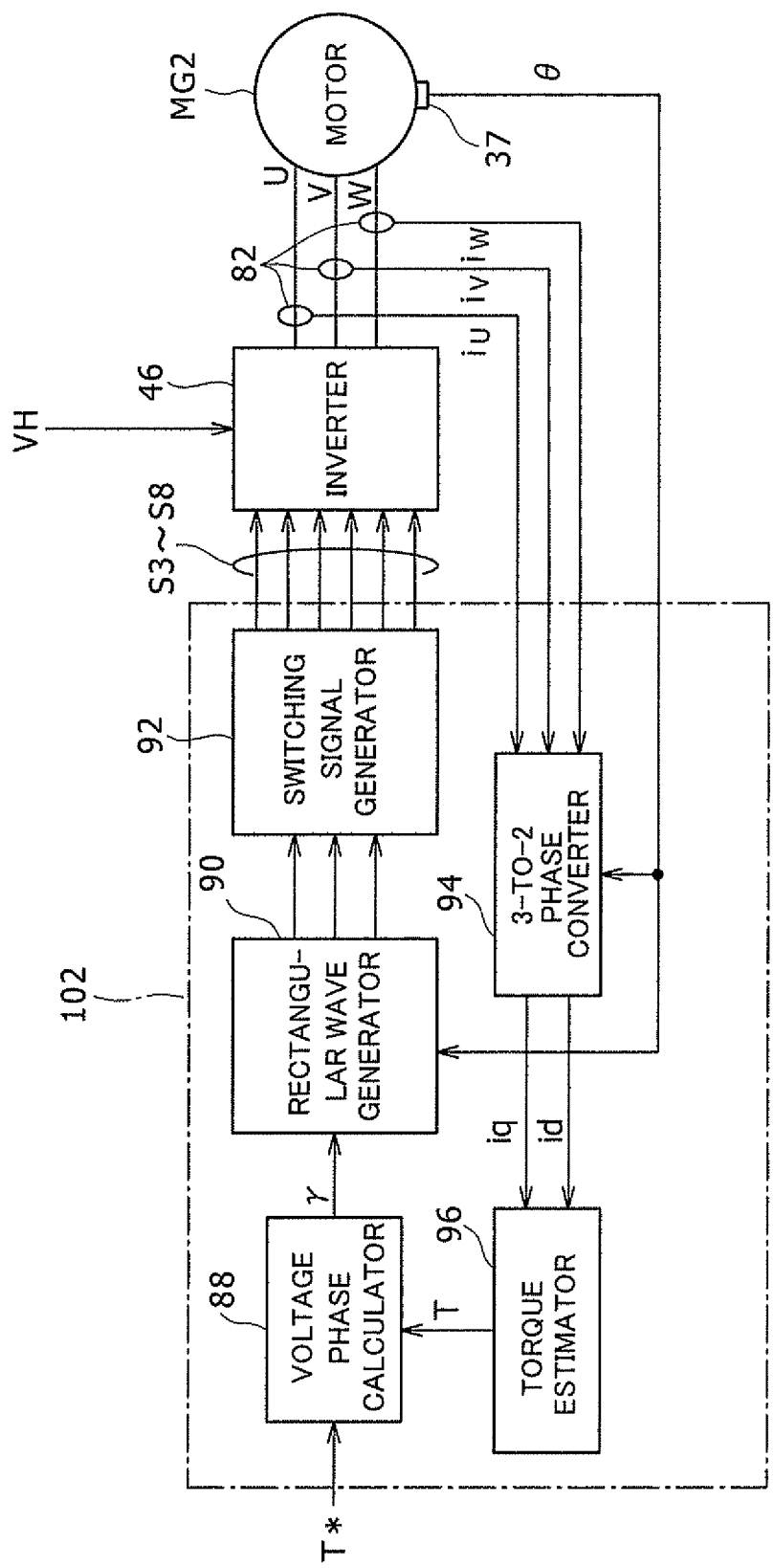
FIG. 4 shows a functional block diagram of a rectangular wave control block included in the motor ECU.

The rectangular wave control block 102 is explained below by referring to FIG. 4. The rectangular wave control block 102 includes a 3-to-2 phase converter 94, a torque estimator 96, a voltage phase calculator 88, a rectangular wave generator 90, and a switching signal generator 92.

The 3-to-2 phase converter 94 respectively converts each of the three phase currents iu, iv, iw which are detected by the current sensor 82 to d-axis actual current id and q-axis actual current iq based on the motor rotation angle θ and outputs the converted currents to the torque estimator 96. The torque estimator 96 performs a table lookup calculation to obtain an estimated torque value T based on the d-axis actual current id and the q-axis actual current iq from a predetermined map or table and outputs the obtained toque value to the voltage phase calculator 88.

The voltage phase calculator 88 obtains a control deviation by performing a PI calculation using a predetermined gain on a torque deviation ΔT which can be obtained by subtracting the estimated torque T from the torque command T*; determines a phase γ of the rectangular wave voltage in accordance with the obtained control deviation; and outputs the determined phase to the rectangular wave generator 90. Specifically, if the torque command T* is positive (T*>0), voltage phasing is advanced with shortage of torque, while the voltage phasing is delayed with excessive torque. On the contrary, if the torque command T* is negative (T*<0), the voltage phasing is delayed with shortage of torque, while the voltage phasing is advanced with excessive torque.

The rectangular wave generator 90 generates each of three phase voltage commands (rectangular wave pulses) Vu, Vv, and Vw in accordance with the input voltage phase γ and outputs the generated commands to the switching signal generator 92. The switching signal generator 92 generates switching signals S3 to S8 in accordance with each of the three phase voltage commands Vu, Vv, and Vw and outputs the generated signals to the inverter 46. In this way, because the inverter 46 performs switching operation in accordance with the switching signals S3 to S8, a rectangular wave pulse in accordance with the voltage phase γ is applied to the motor MG2 as each phase voltage. Thus, in the rectangular wave control system, a motor torque control can be performed by torque feedback control.

It should be noted that the switching signal generator 80 of the PWM control block 100 may be also used as the switching signal generator 92 of the rectangular wave control block 102.

Figure 5:
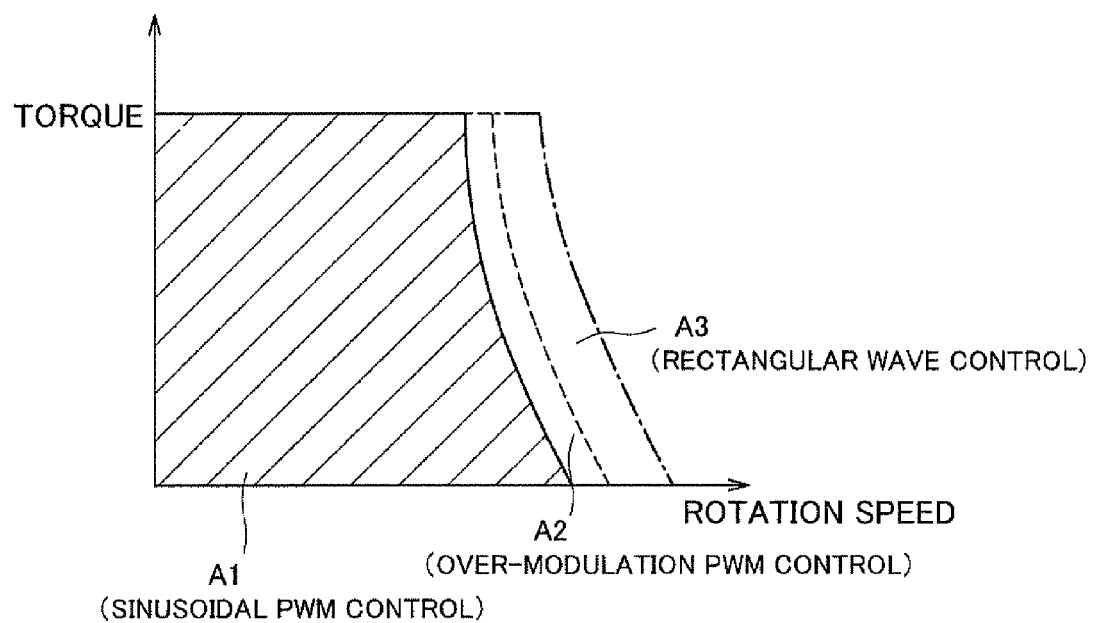
FIG. 5 shows a graph mapping a relationship between torque and rotation speed of a traction motor.

FIG. 5 shows a mapping graph which is stored in advance in the control system selector 106 of the motor ECU 60. This mapping graph is defined for the motor MG 2 based on the torque and rotation speed. The control system selector 106 selects a motor control system by referring to this mapping graph.

In the mapping graph shown in FIG. 5, a solid line indicates a relationship between the rotation speed and the maximum output torque of the motor MG2 in the sinusoidal PWM control. At an operating point within a hatched area A1 enclosed by the solid line, the sinusoidal PWM control is performed for the motor MG2. The system voltage VH (that is, the boost ratio by the converter 48) is controlled such that the modulation ratio K in the sinusoidal PWM control is constant at the maximum value of 0.61. However, because the boosting by the converter 48 has an upper limit, a higher rotation speed area enclosed by the solid line and dashed line in which the system voltage VH is at the maximum and the modulation ratio K satisfies 0.61<K<0.78 is the over-modulation PWM control area A2, while the highest rotation speed area enclosed by the dashed line and the dashed dotted line in which the system voltage VH is at the maximum and the modulation ratio K equals 0.78 is the rectangular wave control area A3.

Figure 6:
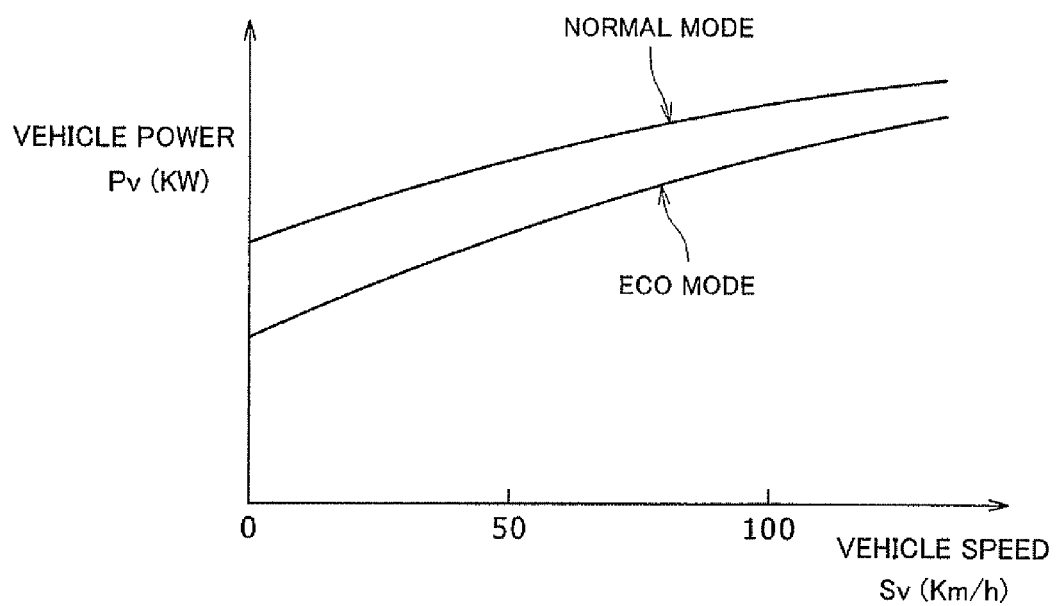
FIG. 6 shows a graph mapping a relationship between vehicle speed and vehicle power in a normal mode and that in an eco mode.
Figure 7:
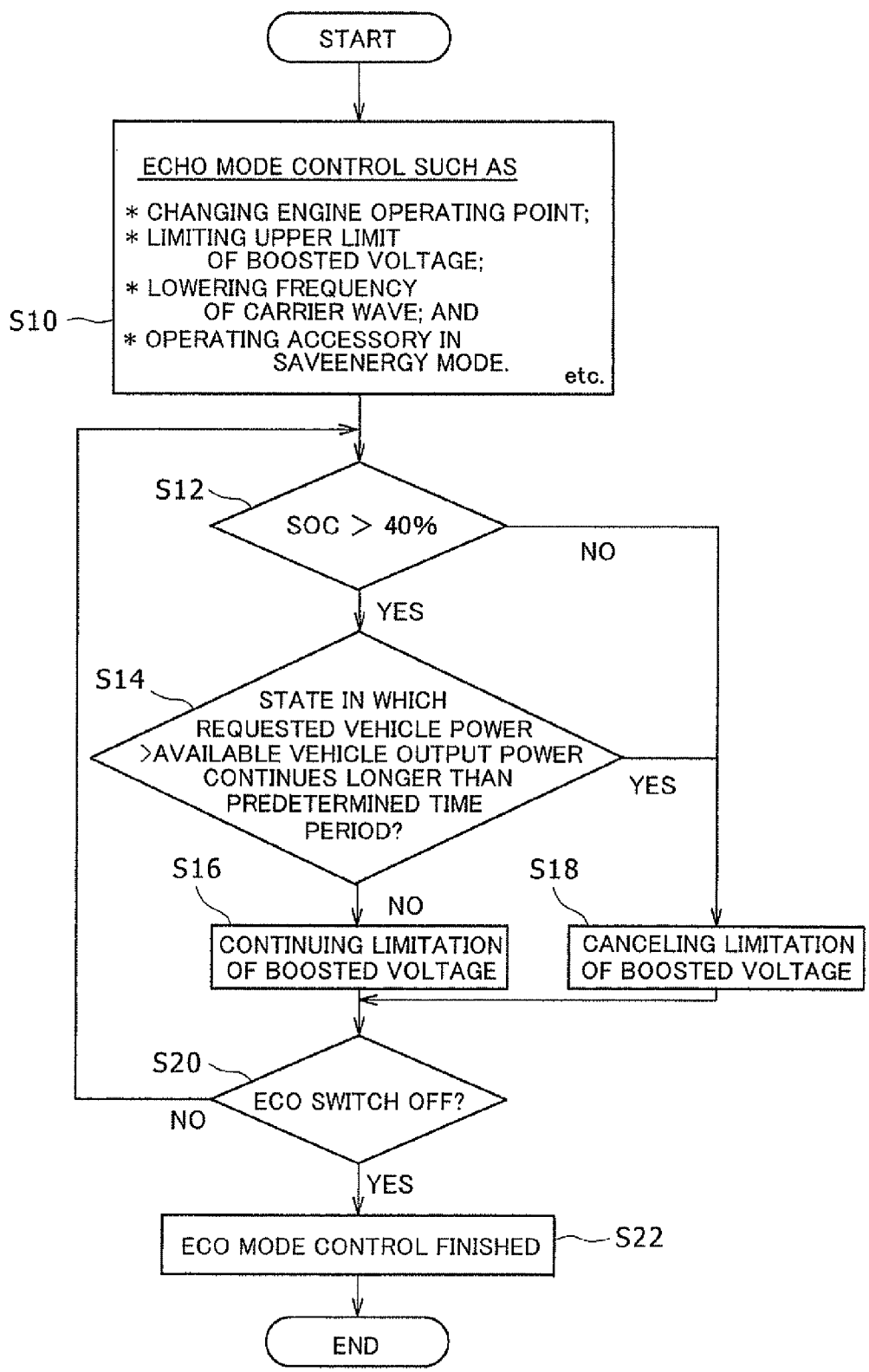
FIG. 7 shows a flow chart indicating a process routine performed by a hybrid ECU when the eco mode is selected.

An eco mode control in the above hybrid vehicle 10 is explained below by referring to FIGS. 6 and 7. FIG. 6 is a graph mapping a relationship between the vehicle speed Sv and the vehicle power both in a normal mode with the eco switch 72 (FIG. 1) not turned ON and an eco mode with the eco switch 72 turned ON. The solid lines in FIG. 6 represent the maximum power of the vehicle which can be output in the normal mode and the eco mode. FIG. 7 is a flowchart showing a process routine which is performed in the hybrid ECU 66 when the eco switch 72 is turned ON.

When a driver wishes a drive in which priority is placed on fuel efficiency rather than on vehicle driving performance, the driver can turn ON the eco switch 72 to select the eco mode. In this way, as shown in FIG. 6, the maximum power that can be output from the vehicle is set at a lower value than that in the normal mode.

More specifically, when the eco switch 72 is turned ON, an eco-switch-ON signal "Eon" is input to the hybrid ECU 66. Upon receipt of this signal, the hybrid ECU 66 performs an eco mode control shown in step S10 in FIG. 7. In this eco mode control, controls are performed, including changing of the engine operating point by lowering the upper limit of rotation speed of the engine 12; applying a boosting limit by lowering the boosting upper limit of the converter 48 from the first upper limit of, for example, 650 volts to the second upper limit of, for example, 500 volts; lowering frequency of the carrier waves used for comparison with the voltage command for generating motor input voltage in the inverter 46; and operating accessories such as an air conditioner in the eco mode (for example, intermittent operation of an air compressor for the air conditioner).

In such an eco mode control, fuel consumption is reduced because of the lowered upper limit of engine rotation speed; a switching loss at the converter 48 is reduced because of the lowered boosting upper limit of the converter 48; a switching loss at the inverter 46 is reduced because of the lowered frequency of the above carrier waves; and power consumption can be reduced because of the eco mode operation of the accessories. As a result, a drive with enhanced fuel efficiency as compared with a drive in a normal mode becomes possible, and thus energy efficiency is improved.

However, in the above eco mode, the rotation speed of the traction motor MG2 and that of the generator motor MG1 are limited. Especially, such a limitation of the rotation speed of the generator motor MG 1 causes a drop of the amount of generated electric power. In such a case, depending on the state of charge (SOC) of a battery 50 and the driving state of the vehicle in accordance with the user's operation, it is possible that an intermittent operation of the engine is more frequently performed in order to charge the battery. This may cause an undesired result such as deterioration of the fuel efficiency or drop of the SOC of the battery 50 significantly below 40%; that is, the lower limit of the appropriate range.

More specifically, when vehicle power higher than the maximum vehicle output power which is available in the eco mode shown in FIG. 6 is continuously demanded by the driver or user by deeply depressing the accelerator pedal, electric power higher than the amount generated by the generator motor MG1 is retrieved from the battery 50 in order to drive the motor MG2, and thus the state of charge of the battery becomes significantly low. This may cause a situation in which the state of the charge of the battery becomes significantly lower than the lower limit of the appropriate range of the battery. When the state of charge of the battery 50 becomes significantly lower than the lower limit of the appropriate range, the battery 50 may be damaged, resulting in a shorter battery life.

To avoid such a situation, in the eco mode process routine shown in FIG. 7, the steps described below are performed. In step S12, it is determined whether or not the state of charge (SOC) exceeds a threshold value, for example, 40%. If it is determined that the SOC is lower than 40% ("NO" in step S12), the boosting limit is cancelled by switching the boosting upper limit of the converter 48 from 500 volts to 650 volts, which is at the same level as in the normal mode (step S18). In this way, the rotation speed limit of the generator motor MG1 is also cancelled, thereby ensuring that a sufficient amount of electric power is generated. As a result, charging to the battery 50 is enabled such that the state of charge can be restored in an appropriate range of the SOC.

On the other hand, if it is determined that the state of charge (SOC) of the battery is higher than 40% ("YES" in step S12), it is subsequently determined whether or not the state in which the vehicle requiring power Pv* is higher than the maximum available output power Pv of the vehicle has been continued longer than a predetermined time period (step S14). The "predetermined time period" described here is preferably about a few seconds, in order to exclude an instantaneous depression of the acceleration pedal by the driver.

The vehicle requiring power Pv* is set based on an accelerator opening degree Ac and a vehicle speed Sv by referring to a map prestored in a ROM. If the time period in which the vehicle requiring power Pv* is higher than the maximum output power available in eco mode shown in FIG. 6 has continued for longer than the predetermined time period ("YES" in step S14), the boosting limit of the converter 48 is cancelled, similarly as described above (step S18). On the other hand, if determined not ("NO" in step S14), the boosting limit of the converter 48 is maintained (step S16).

Then, it is determined whether or not the eco switch 72 is turned OFF (step S20). If the eco switch 72 is not turned OFF ("NO" in step S20), processing returns to step S12, while if the eco switch 72 is turned OFF ("YES" in step S20), the eco mode control is finished; that is, the normal mode is restored (step S22), and the processing is completed.

As described above, the hybrid vehicle 10 according to an embodiment of the present invention makes it possible not only to improve fuel efficiency by selecting the eco mode but also avoid a situation in which the state of charge (SOC) of the battery drops significantly lower than the lower limit of the appropriate range by cancelling the boosting limit of the converter 48 immediately after the state of the charge of the battery drops lower than the lower limit of 40%.

Although in the hybrid vehicle 10 described above only the boosting limit of the converter 48 among the eco mode controlling factors is cancelled when the state of charge of the battery drops lower than 40%, it is also possible to cancel another eco mode controlling factor which is closely related to the charging of the battery, such as rotation speed limit of the engine 12, in addition to the cancelling of the boosting limit of the converter 48.

Further, although the eco mode is selected by the user by turning ON the eco switch 72 in the hybrid vehicle 10 described above, it is also possible that the hybrid ECU 66 which totally controls the hybrid vehicle 10 automatically switches between the normal mode and the eco mode in accordance with a driving state. For example, the hybrid ECU 66 may switch from the normal mode to the eco mode when a stable driving state is maintained at about a constant speed for longer than a predetermined time period. In this case, the hybrid ECU 66 functions also as a selector.

Further, in the above hybrid vehicle 10, it is described that the eco switch 72 is a selector, and further that the normal mode is the first mode and the eco mode is the second mode. However, the present invention is not limited to such an embodiment. For example, the present invention may be applied in such a manner that a power switch which is turned ON when the driver wishes to place priority on a vehicle driving performance rather than fuel efficiency is used as a selector; a normal mode serving as the second mode is selected when the power switch is turned OFF, while the power mode serving as the first mode is selected when the power switch is turned ON.

Furthermore, although the above hybrid vehicle 10 is explained by using a so-called series/parallel hybrid system as an example in which the power of the engine 12 is used for driving both the wheels and the generator, the present invention is also applicable to a vehicle of so-called series hybrid system in which the power of the engine is used only for driving the generator.

[Reference Numerals]

10 hybrid vehicle, 11 rotational position sensor, 12 engine, 13 output shaft, 14 power distribution/integration mechanism, 16 engine control ECU, 18 sun gear, 20 ring gear, 22 carrier, 24 damper, 26 carrier supporting member, 28 carrier shaft, 29, 36 rotors, 30, 38 rotation shafts, 31, 37 rotation angle sensors, 32 ring gear shaft, 34 reducer, 40 axle, 42 wheels, 44, 46 inverters, 48 converter, 50 battery, 52, 54 smoothing capacitors, 56 power line, 58 ground line, 60 motor ECU, 62 battery state detecting sensor, 64 battery ECU, 66 hybrid ECU, 68 vehicle speed sensor, 70 accelerator opening degree sensor, 72 eco switch, 74 current command generator, 76 voltage command generator, 78 2-to-3 phase converter, 80, 92 switching signal generators, 82 current sensor, 84, 94 3-to-2 phase converters, 86 rotation speed calculator, 88 voltage phase calculator, 90 rectangular wave generator, 96 torque estimator, 100 PWM control block, 102 rectangular wave control block, 104 converter controller, 106 control system selector, MG1 generator motor, MG2 traction motor.

The invention claimed is:

1. A hybrid vehicle comprising an engine, a generator capable of generating electric power from mechanical power received from the engine, a battery for storing the electric power generated by the generator, and an electric motor capable of outputting mechanical traction power from the electric power supplied from the battery and the generator, the hybrid vehicle further comprising:
 a voltage converter for boosting a voltage of the battery and supplying the boosted voltage to the electric motor;
 a selector for selecting a first mode or a second mode for the boosting operation of the voltage converter; and
 a controller for switching an upper limit of voltage boosted by the voltage converter from a first upper limit in the first mode to a second upper limit which is lower than the first upper limit when the second mode is selected by the selector, and switching the upper limit of voltage boosted by the voltage converter from the second upper limit to the first upper limit when a state of charge (SOC) of the battery drops below a threshold.

2. The hybrid vehicle according to claim 1, wherein the controller switches the upper limit of voltage boosted by the voltage converter from the second upper limit to the first upper limit when a state in which a power requested to a vehicle by a user exceeds a maximum vehicle output power available in the second mode has continued for a predetermined time period.

3. The hybrid vehicle according to claim 2, wherein the hybrid vehicle further comprises a generator inverter and an electric motor inverter, both having a DC/AC converting function, and the inverters are connected to a common voltage converter.

4. The hybrid vehicle according to claim 1, wherein
 when the second mode is selected by the selector, the controller performs, in addition to a control of switching the upper limit of voltage boosted by the voltage converter, at least one of controls of
 changing an engine operating point;
 lowering a frequency of a carrier wave which is used to generate an input voltage to the electric motor; and
 operating an accessory including an air conditioner in a saveenergy mode,
 when the state of charge (SOC) drops below a threshold, the controller performs a control to restore, among controls performed in the second mode, only the upper limit of voltage boosted by the voltage converter from the second upper limit to the first upper limit.

5. The hybrid vehicle according to claim 4, wherein the hybrid vehicle further comprises a generator inverter and an electric motor inverter, both having a DC/AC converting function, and the inverters are connected to a common voltage converter.

6. The hybrid vehicle according to claim 1, wherein
 when the second mode is selected by the selector, the controller performs, in addition to a control of switching the upper limit of voltage boosted by the voltage converter, at least one of controls of
 changing an engine operating point;
 lowering a frequency of a carrier wave which is used to generate an input voltage to the electric motor; and
 operating an accessory including an air conditioner in a saveenergy mode,
 when the state of charge (SOC) drops below a threshold, the controller performs a control to restore, among controls performed in the second mode, the upper limit of voltage boosted by the voltage converter from the second upper limit to the first upper limit; and the controller finishes the control to change the engine operating point if the control to change the engine operating point has been performed.

7. The hybrid vehicle according to claim 6, wherein the hybrid vehicle further comprises a generator inverter and an electric motor inverter, both having a DC/AC converting function, and the inverters are connected to a common voltage converter.

8. The hybrid vehicle according to claim 1, wherein the hybrid vehicle further comprises a generator inverter and an electric motor inverter, both having a DC/AC converting function, and the inverters are connected to a common voltage converter.

* * * * *